(12) United States Patent
Maeshiro et al.

(10) Patent No.: US 9,688,312 B2
(45) Date of Patent: Jun. 27, 2017

(54) SLIDABLE PILLAR FOR ADJUSTING AN OPENING SIZE INTO A VEHICLE AND METHOD THEREOF

(71) Applicant: Honda Motor Co., Ltd., Tokyo (JP)

(72) Inventors: Shinji Maeshiro, Cypress, CA (US); James Hsin Yao Lee, Gardena, CA (US)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 14/818,542

(22) Filed: Aug. 5, 2015

(65) Prior Publication Data

US 2017/0036702 A1  Feb. 9, 2017

(51) Int. Cl.
*B62D 25/04* (2006.01)
*B60J 5/04* (2006.01)

(52) U.S. Cl.
CPC ............ *B62D 25/04* (2013.01); *B60J 5/0477* (2013.01); *B60J 5/04* (2013.01); *B60J 5/0479* (2013.01)

(58) Field of Classification Search
CPC . B62D 25/04; B60J 5/0479; B60J 5/04; B60J 5/0477
See application file for complete search history.

(56) References Cited

U.S. PATENT DOCUMENTS

| | | | |
|---|---|---|---|
| 1,376,442 A | 5/1921 | Kehoe | |
| 1,869,274 A | 7/1932 | Phillips | |
| 7,819,465 B2 | 10/2010 | Elliott et al. | |
| 8,419,117 B2 | 4/2013 | Stephens | |
| 8,474,894 B2 | 7/2013 | Gerhardt et al. | |
| 2006/0186685 A1* | 8/2006 | Nagle | B62D 33/0273 296/26.11 |
| 2014/0077523 A1* | 3/2014 | Choi | B60J 5/043 296/146.9 |

FOREIGN PATENT DOCUMENTS

| | | | | |
|---|---|---|---|---|
| DE | 102008009567 A1 * | 8/2009 | | B62D 25/04 |
| GB | 2408025 A | 5/2005 | | |
| KR | 20110032950 A * | 3/2011 | | |

* cited by examiner

*Primary Examiner* — Glenn Dayoan
*Assistant Examiner* — Melissa A Black
(74) *Attorney, Agent, or Firm* — Honda Patents & Technologies North America, LLC; Aaron C. Fong

(57) ABSTRACT

A system for adjusting a size of an access into a vehicle is provided. The system may include a pillar, which may be substantially vertical, and a track allowing the pillar to be moved. A latch may be attached to the pillar securing the pillar along the track. The pillar may be secured at one or multiple locations along the track. Multiple rolling mechanisms may be part of the pillar. These mechanisms may allow the pillar to glide back and forth enlarging or reducing the entrance into the vehicle from the front or rear entrances. The track may be interior to a front and rear door of the vehicle.

16 Claims, 7 Drawing Sheets

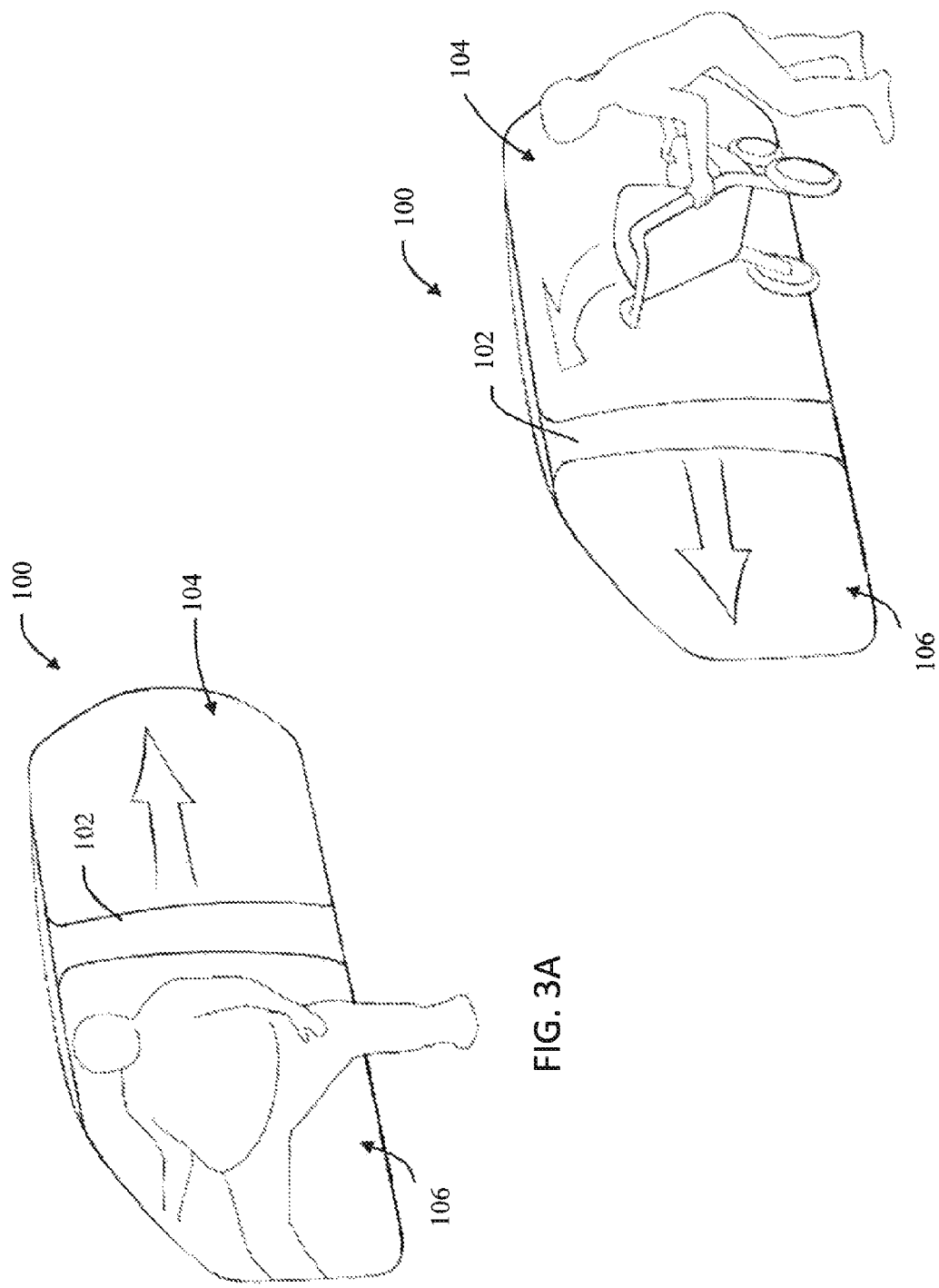

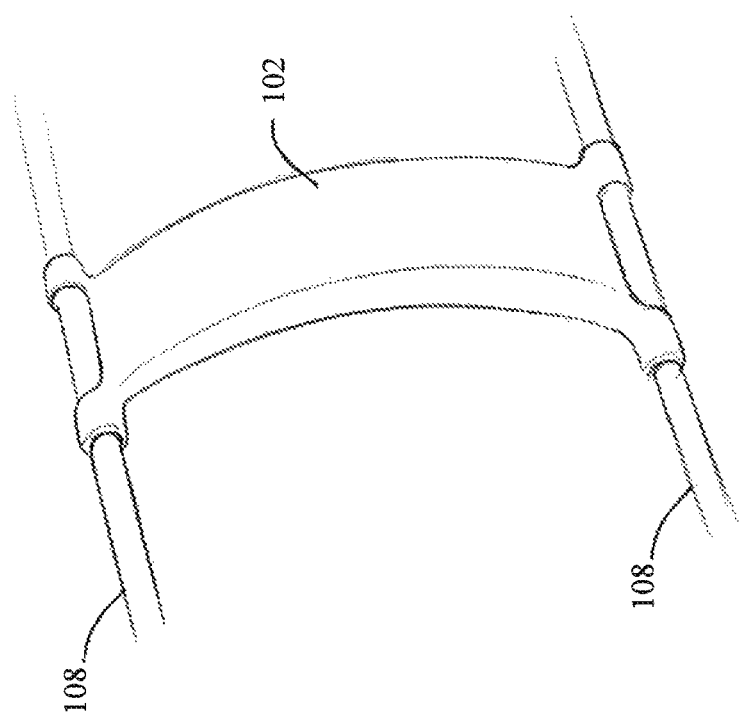

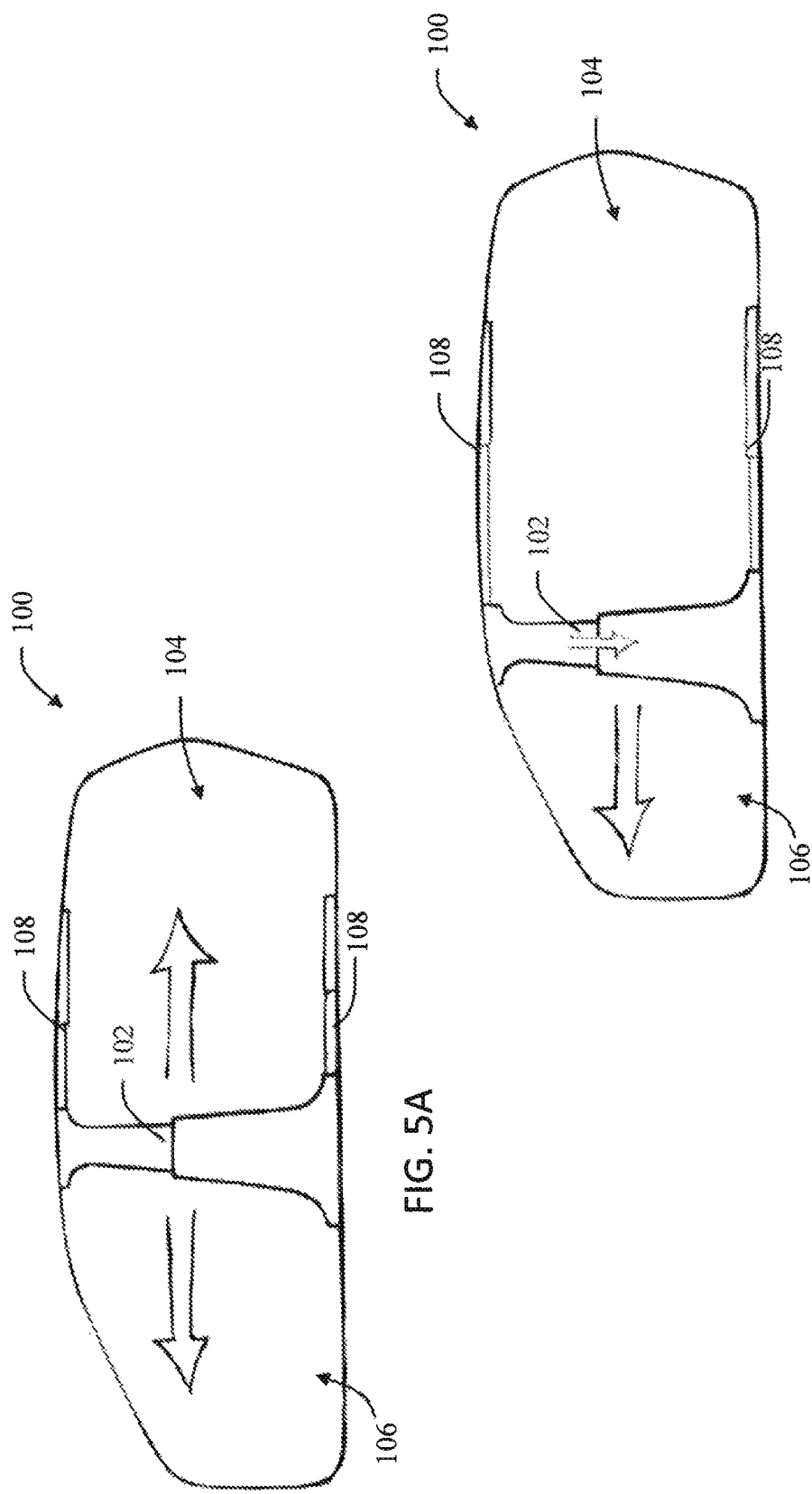

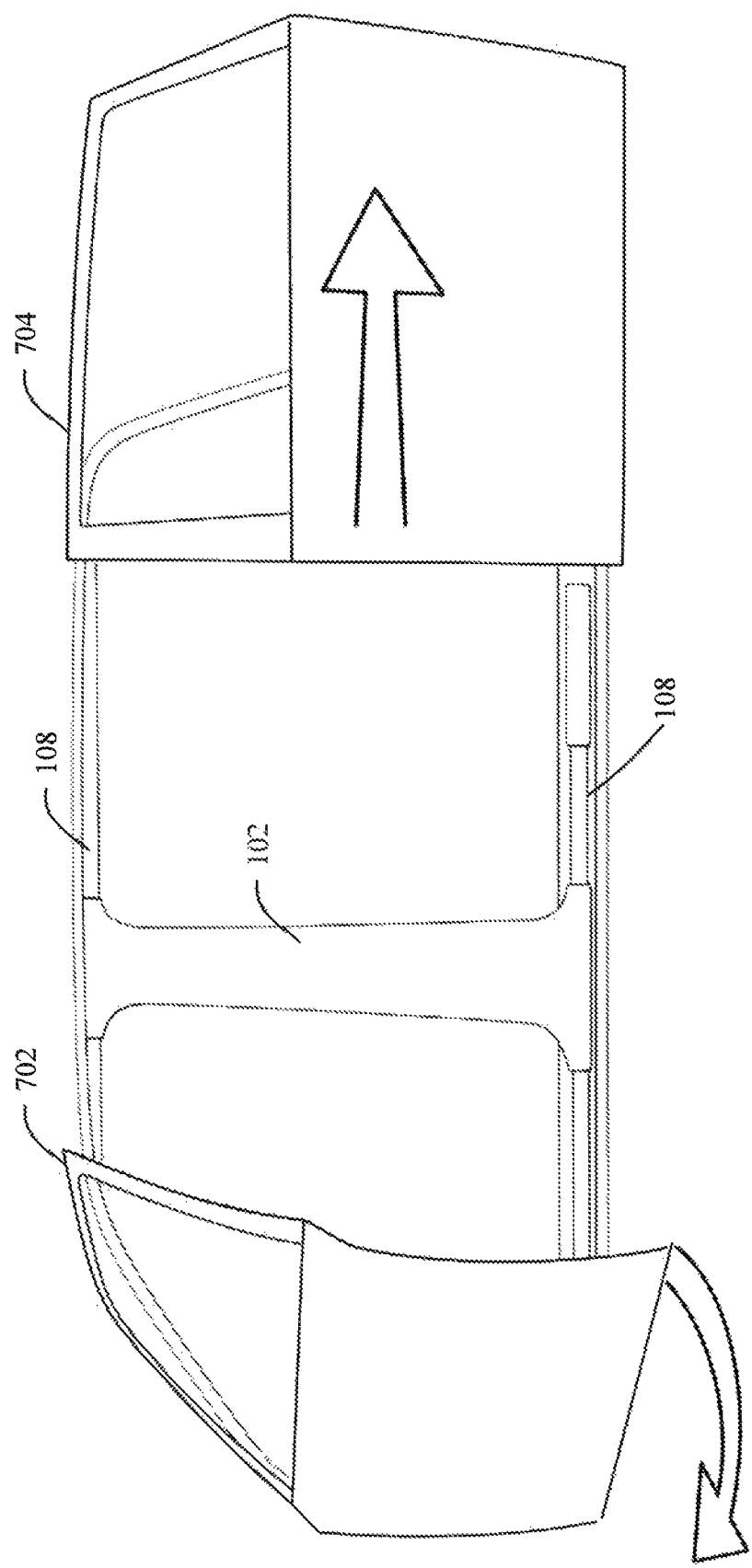

SLIDABLE PILLAR FOR ADJUSTING AN OPENING SIZE INTO A VEHICLE AND METHOD THEREOF

BACKGROUND

The present disclosure generally relates to adjusting an opening size into a vehicle through a slidable pillar. Automobile manufacturers have designed vehicles to have bulkheads to maximize the carrying capacity of the vehicle and to have an intermediate pillar support that can be attached to a forward opening door or a rearward opening door allowing for removal of the intermediate pillar support especially in emergency situations. None of these manufacturers however have provided a pillar, such as a B-Pillar, moving together with or separate from the bulkhead or a user being able to slide the intermediate pillar in a horizontal direction of the vehicle in order to make entering the vehicle easier.

BRIEF DESCRIPTION

According to one embodiment of the present disclosure, a system for adjusting an opening into a vehicle is provided. The system may include a longitudinal track and a slidable pillar movable along the longitudinal track enlarging or reducing the opening into the vehicle.

According to another embodiment of the present disclosure, a vehicle is provided. The vehicle may include a pillar movable along a longitudinal track having a latch securing the member to the longitudinal track between a front and rear door.

According to yet another embodiment of the present disclosure, a vehicle is provided. The vehicle may include a track and a pillar movable along the track enlarging or reducing an opening into the vehicle

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIGS. 3A and 3B illustrate exemplary uses of the pillar for adjusting a size of the access into the vehicle with FIG. 3A providing a person entering the driver's seat and FIG. 3B depicting a user placing a stroller into the rear passenger seat area according to one aspect of the present disclosure;

FIG. 4 illustrates an exemplary slidable pillar across a track showing a frictionless surface according to one aspect of the present disclosure;

FIGS. 5A and 5B illustrate an exemplary telescopic pillar adjusting to curvatures within a system track in according to one aspect of the present disclosure;

FIG. 6 illustrates an exemplary vehicle having a front and rear door with the pillar described beforehand according to one aspect of the present disclosure.

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, systems and devices provided herein are directed to adjusting the size of an access into a vehicle by sliding a vertical member horizontally so as to make more room for passengers and storage materials. A vertical pillar may be provided in a vehicle. The pillar may take the form of a B-Pillar and may have a lever that when actuated by a user, the pillar is unlocked from a default position and the user may slide the pillar horizontally to adjust the size of the access. Once the pillar assumes its original default position, a locking mechanism may lock the pillar in that position.

A number of advantages may be provided by using the systems and devices described herein. The size of an opening into the vehicle may be adjusted in order to makes access into a vehicle easier and more efficient for passengers and storage materials. For example, currently, passengers have difficulties placing strollers or wheelchairs into vehicles because of the limited size of the opening either through the front or rear door of a vehicle. These systems and devices may allow the entrance into the vehicle to be enlarged as to allow large storage materials such as strollers or wheel chairs to be placed into the vehicle. Additionally, individuals who are larger in size or frail and have problems moving, have difficulties entering vehicles. These systems and devices may allow either the front or back door entrance to be enlarged as to make the process of entering a vehicle easier. For example, an elderly and sick person may have issues getting into a vehicle. By sliding the vertical pillar, entering a vehicle may become easier for the elderly person since it is larger and wider. Additionally, traveling with wheel chairs may be difficult. Typically, the person has to be taken out of the wheel chair, placed in the vehicle, and the wheel chair placed in the vehicle separately. By sliding the vertical pillar, the wheel chair may be placed in the vehicle and the person may sit in the wheel chair during the tenure in the vehicle. Other materials such as but not limited to furniture, luggage and large televisions may also be stored in the vehicle by adjusting the size of the access. Other advantages will become apparent from the description provided below.

Figure 1A:
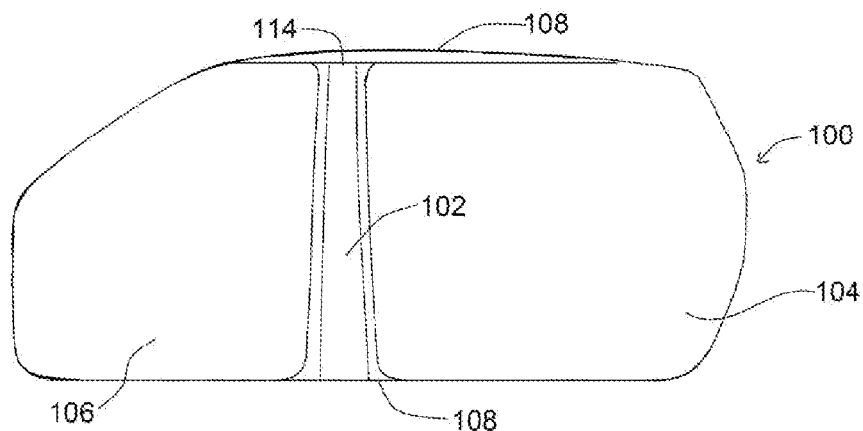
FIGS. 1A, 1B and 1C illustrate a side view of an exemplary vehicle having a system and device for adjusting a size of an access into a vehicle with a vertical pillar at its original default position in FIG. 1A, and with the vertical pillar having been slid horizontally in both directions to an adjusted position in FIGS. 1B and 1C according to one aspect of the present disclosure.
Figure 1B:
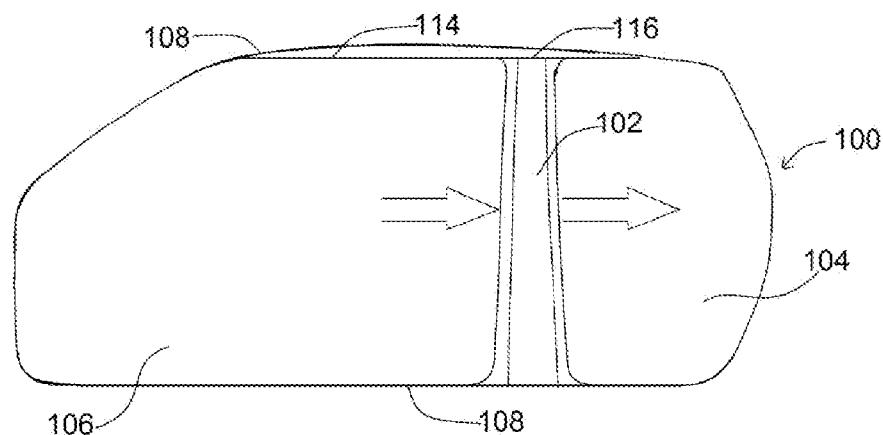
Figure 1C:
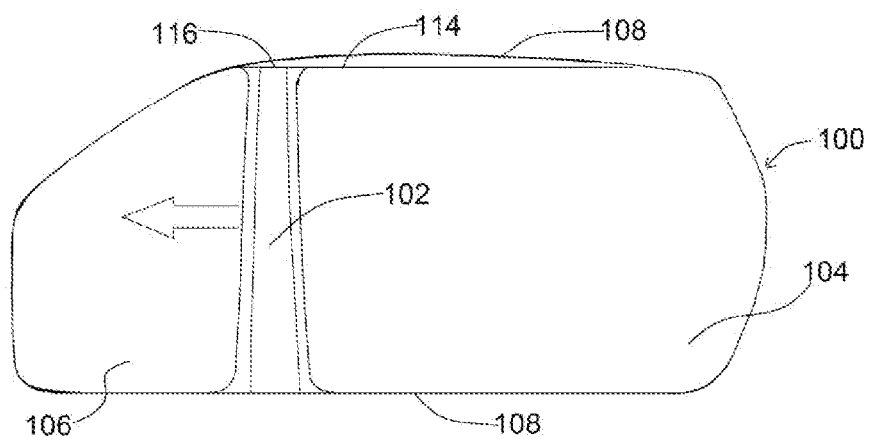

Turning now to FIGS. 1A, 1B and 1C, a system 100 for adjusting a size of an access into a vehicle by sliding a vertical pillar 102 horizontally so as to make more room for passengers or storage materials in accordance with one embodiment of the present disclosure is provided. The system 100 may include a pillar 102, which may be vertical or substantially vertical, a rear entrance 104, a front entrance 106, and a longitudinal track 108. Fewer or more of these components may be provided within the system 100 and those shown are not necessarily limiting to the system 100. Different views may reveal different features. Throughout the disclosure, a number of embodiments of the device 100 are shown. Combinations of the components within the embodiments may be reconfigured and are within the scope of this disclosure.

The embodiment shown in FIG. 1A includes a vertical pillar 102 at a default position 114. This vertical pillar 102 may include a B-Pillar. Other pillar, such as the A, C and D Pillars, may be slidable or movable to enlarge the entrance. Pillars may be the vertical or near vertical supports of a vehicle's window area. Pillars may be designated respectively as the A, B, C or D-Pillar, moving from the front of the vehicle to the rear, in a profile view. Typically, a B-Pillar 102 may be the center pillar, and it may be a closed steel structure welded. The B-Pillar 102 may provide structural support to the vehicle's roof panel, and it is designed for latching the front door and mounting the hinges for the rear doors. Some pillar designs may employ slimmer, chamfered windscreen pillars but pillars are not limited to these designs. Pillars may help improve driver vision (thus reducing blind spots) through the use of stronger alloy steel in these components. Typically, the center or B-Pillar 102 may be a multi-layered assembly of various lengths and strengths.

The vehicle used for this system 100 may include both front and rear seats for carrying passengers. Front entrances 106 may be used for drivers while rear entrances 104 may be used for passengers. The system 100 may be applied on both sides of the vehicle. A front door may open in the forward facing direction and provide protection to the driver. In the default position 114, the front door along with the pillar 102 provides protection when impacted on a side of the vehicle. A rear door may open in the rearward facing direction. The rear door may be secured to the vertical pillar 102 when the rear door is closed. The rear door may slide horizontally to open or may open in another way such as in the forward direction.

In one embodiment, the pillar 102 may automatically return to a default position 114 on the longitudinal track 108. A lower rail of the track 108 may be angled such that the pillar 102 may naturally go back to its default position 114. For example, the lower rail may be bent at the default position 114 whereby the pillar slides towards it using gravity. Other automated or mechanical structures may be used to return the pillar 102 to its default position.

The system 100 in FIGS. 1A, 1B and 1C may also include a track 108 that connects the vertical pillar 102 to the top and bottom of the vehicle. The track 108 may use frame connectors to hold the vertical pillar 102 in place inside the door opening. The track 108 may allow a user to slide the vertical pillar 102 horizontally to adjust the size of the access of the vehicle. The longitudinal track 108 may cover a distance from the front door 106 to the end of the rear door 104. These distances may be modified and shortened or extended to fit the specific vehicle type or need.

The system 100 additionally may include a latch that when actuated by a user, the vertical pillar 102 is unlocked from a default position 114 and the user may slide the vertical pillar 102 horizontally to adjust the size of the access. The latch may include various shapes and designs not listed or mentioned and the latch may be positioned in various positions not explicitly mentioned. Further details regarding the latch will be provided below.

FIGS. 1B and 1C show exemplary embodiments of the system 100, when the latch has been actuated, and a user has slid or moved the vertical pillar 102 to the left and the right to an adjusted position 116 from the default position 114. The default position 114 in one embodiment may be the position in the center of the vehicle where a typical B pillar is placed. This default position 114 may be changed by the user to meet desired conditions. The adjusted position 116 varies on the need of the user to allow entrance into the vehicle and may range from few inches to the end of the longitudinal track 108 either to the left or the right.

Figure 2B:
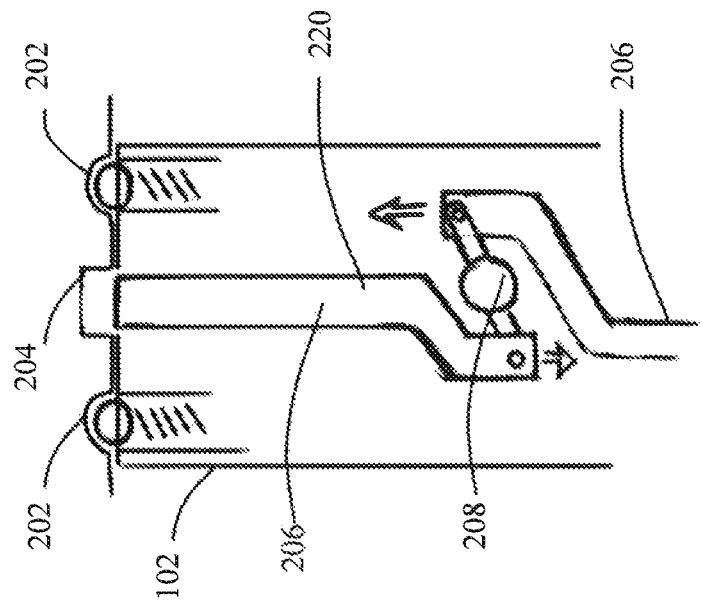
FIG. 2 illustrates a view of an exemplary vertical pillar and a latch of the vertical pillar to secure the pillar into a track according to one aspect of the present disclosure.
Figure 2A:
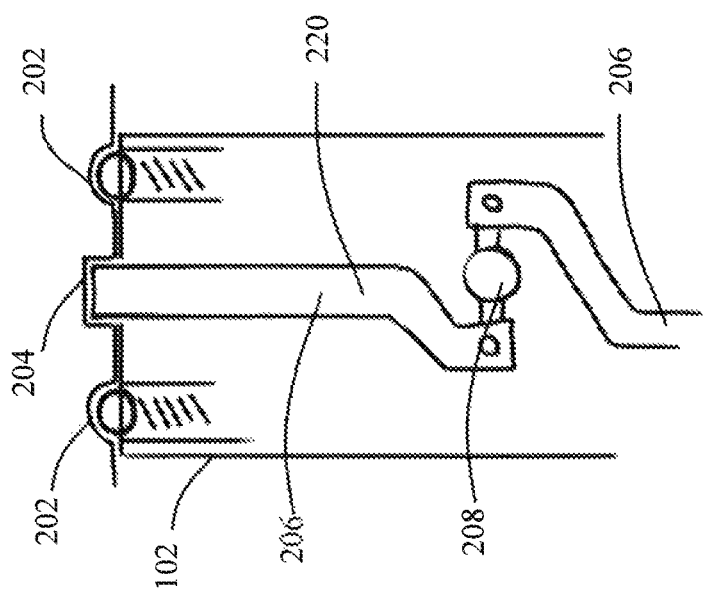

FIGS. 2A and 2B provide a view of an exemplary vertical pillar 102 described earlier in a locked and unlocked position according to one embodiment of the present disclosure. The vertical pillar 102 may include rolling mechanisms 202 and a latch 220 that itself is composed of various components. Fewer or more components exist within the pillar 102 and those shown are not necessarily limiting to the pillar 102. Different views may reveal different features.

Once the latch 220 is actuated, the latch 220 unlocks the vertical pillar 102. The latch 220 may include a combination of upper and lower posts 206 connected to a swivel 208 that rotates when the latch 220 is actuated. As seen in FIG. 2A, when the vertical pillar 102 is in a locked position, a post 206 is inserted into a compartment 204 that protrudes above or below the vertical pillar 102 and holds the vertical pillar 102 in place. The compartment 204 with the post 206 may secure the pillar 102 into place. A similar action happens for the lower post 206 when the latch 220 is locked.

Once the latch 220 is released, and the swivel 208 rotated, the upper post 206 moves down while the lower post 206 moves upwards. Each of the posts 206 may move out of their compartments 204, and the vertical pillar 102 is movable and slidable horizontally as seen in FIG. 2B.

When the front door and the rear door of the vehicle are closed, and the vertical pillar 102 is positioned in a default position 114, the vertical pillar 102 is locked in place. Once either the front door or the rear door is opened, the latch 220 may be actuated and the vertical pillar 102 may be slide or moved towards the front entrance 106 or rear entrance 104. The latch 220 may be locked into the top and bottom rail and are within an interior of the vehicle typically surrounded by the front and rear doors.

In one embodiment, once the vertical pillar 102 is returned to the original default position 114, the latch 220 may rotate the post 206 into the compartment 204 automatically. In another embodiment, the latch 220 may be actuated again to lock the vertical pillar 102 back in place. And in another embodiment, the track 108 may consist of multiple compartments that allow the user to lock the vertical pillar 102 in a desired adjusted position 116. These are not the only embodiments of how the locking mechanism 112 may be coupled to the longitudinal track 108 and how and when the latch 220 reacts when a user actuates the latch 220. Others exist and are within the scope of this disclosure.

Key fobs, or similar devices, may be activated to automatically shift the vertical pillar 102 towards the front entrance 106 or rear entrance 104. Motors, magnets, or other types of devices may be placed within the pillar 102 to move the pillar instead of the rolling mechanisms 202 described above. No manual shifting would be needed in such embodiments.

Sensors may be placed detecting the size of objects entering into the front entrance 106 or rear entrance 104. For example, if sensors detect that a larger driver is entering into the front entrance 106, the vertical pillar 102 may be shifted accordingly. The vertical pillar 102 may be shifted oppositely if a large object or person is coming in through the rear entrance 104. Sensors may include cameras, infrared devices, and other detectors. The vertical pillar 102 may be locked into place as long as needed and return back to the default position 114, as described above, when the objects or person has entered.

FIG. 3A and 3B illustrate two embodiments of the system 100. FIG. 3A illustrates the system 100 used to adjust the size of the entrance 106 into the driver's seat of a vehicle. The user may slide the vertical pillar 102 horizontally to the right in order to enlarge the size of the front entrance 106 to allow a larger or less mobile person to enter the vehicle. The same may be done in regard to the rear entrance 104 of the vehicle. FIG. 3B illustrates a user sliding the vertical pillar 102 to the left in order to enlarge the entrance 104 to accommodate for a stroller.

As shown beforehand, rolling mechanisms 202 were used. FIG. 4 illustrates an exemplary slidable member 102 across a track showing a frictionless surface according to one aspect of the present disclosure. Components described above may be also implemented within the pillar 102. The frictionless, or near frictionless, surface on the track 108 may allow the pillar 102 to be moved or slid without the use of the rolling mechanisms 202. Other types of slidable mechanisms may be used by the vertical pillar 102 allowing it to be moved along the track 108. The track 108 may include a top and bottom rail allowing the pillar 102 to move horizontally.

Referring to FIGS. 5A and 5B, an exemplary telescopic pillar 102 adjusting to curvatures within a system track 108 in according to one aspect of the present disclosure is provided. The telescopic pillar 102 for the system 100 may be used to adjust to different shapes of a vehicle. For example, the bottom rail of the track 108 may be consistent, however, the top rail may be angled. Through the telescopic pillar 108, the top portion of the pillar 102 may adjust to irregularities in the top rail. The telescopic portion could be partially collapsed depending on the height of the top rail. The pillar 108, however, would retain B-Pillar properties by still providing safety features from a side impact.

FIG. 6 illustrates an exemplary vehicle having a front door 702 and rear door 704 with the pillar 102 described beforehand according to one aspect of the present disclosure. The doors 702 and 704, when closed, may provide a tight seal through the use of the pillar 102. The pillar 102 may include guards to prevent rain or other liquids form coming into the vehicle. The track 108 may be laid on an interior portion of the vehicle and surrounded by the front door 702 and rear door 704. The front door 702 may be pivoted on a hinge while the rear door 704 may slide back and forth on a separate track from the slidable pillar 102.

Figure 7:
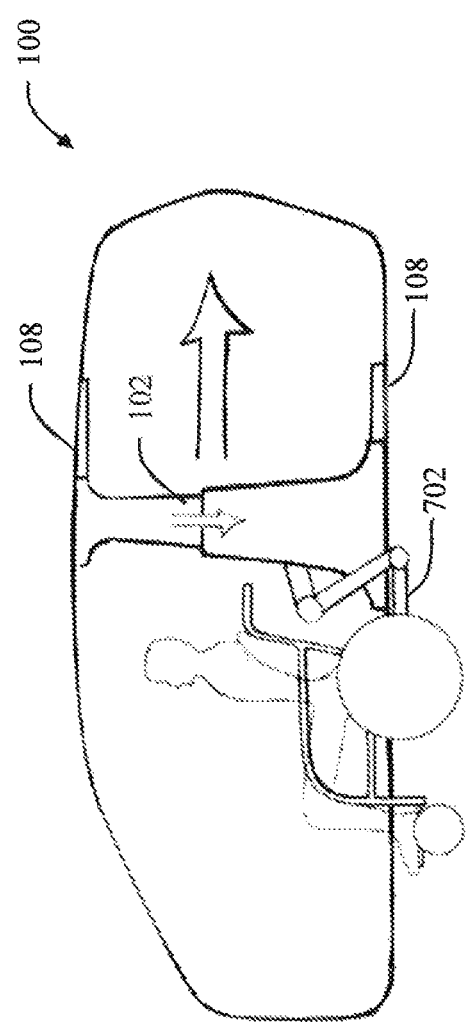
FIG. 7 illustrates an exemplary lift on the pillar according to one aspect of the present disclosure.

FIG. 7 illustrates an exemplary lift 702 on the pillar 102 according to one aspect of the present disclosure. The lift 702 is incorporated into the system 100 to allow a user to load heavy objects into the vehicle, for example, a wheelchair. The wheelchair may be lifted and rotated into the driver seat. The placement of the vertical pillar 102 may be shifted on the track 108 allowing plenty of room for the driver to come into the vehicle. In this fashion, the pillar 102 itself may be rotated clockwise and counterclockwise when looking from a top down perspective.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system for adjusting an opening into a vehicle comprising:
   a longitudinal track having a top and bottom rail; and
   a slidable B-pillar movable along the top and bottom rail of the longitudinal track enlarging or reducing the opening into the vehicle, wherein the slidable B-pillar is telescopic adjusting to curvatures within the longitudinal track when moved along both the top and bottom rail.

2. The system of claim 1, wherein the top and bottom rail are within an interior of the vehicle.

3. The system of claim 1, comprising a front and rear door covering the opening into the vehicle.

4. The system of claim 1, wherein the slidable B-pillar comprises a latch securing the slidable B-pillar to one location on the longitudinal track.

5. The system of claim 4, wherein the latch comprises a swivel member and upper and lower posts.

6. The system of claim 1, wherein the slidable B-pillar automatically returns to a default position on the longitudinal track.

7. The system of claim 1, wherein the slidable B-pillar comprises a lift.

8. A vehicle comprising:
   a B-pillar movable along a longitudinal track having a top and bottom rail and a latch securing the B-pillar to the longitudinal track between a front and rear door, wherein the B-pillar is telescopic adjusting to curvatures within the top rail of the longitudinal track when moved along both the top and bottom rail of the longitudinal track.

9. The vehicle of claim 8, wherein the B-pillar moved towards the front door creates a larger opening within a back of a vehicle.

10. The vehicle of claim 8, wherein the B-pillar moved towards the rear door creates a larger opening within a front of a vehicle.

11. The vehicle of claim 8, wherein the latch is engaged at one point within the longitudinal track.

12. A vehicle comprising:
    a track having a top and bottom rail; and
    a B-pillar movable along the top and bottom rail of the track enlarging or reducing an opening into the vehicle, wherein the B-pillar is telescopic adjusting to curvatures within the track when moved along both top and bottom rail of the track.

13. The vehicle of claim 12, wherein the track extends to a front and rear door of the vehicle.

14. The vehicle of claim 12, wherein the B-pillar comprises a latch holding the member into place on the track.

15. The vehicle of claim 12, wherein the B-pillar comprise a plurality of wheels slidable along the track.

16. The vehicle of claim 15, wherein the plurality of wheels are positioned on a top and bottom portion of the B-pillar.

* * * * *